United States Patent [19]

Mitani et al.

[11] Patent Number: 5,319,010

[45] Date of Patent: Jun. 7, 1994

[54] ORGANOPOLYSILOXANE COMPOSITION FOR VISCOUS FLUID COUPLING

[75] Inventors: Osamu Mitani; Ichiro Murakami, both of Chiba, Japan

[73] Assignee: Dow Corning Toray Silicone Co., Ltd., Tokyo, Japan

[21] Appl. No.: 987,530

[22] Filed: Dec. 4, 1992

[30] Foreign Application Priority Data

Dec. 17, 1991 [JP] Japan .................................. 3-353488

[51] Int. Cl.$^5$ ........................ C08K 5/17; C08G 77/04; C08L 83/04
[52] U.S. Cl. .................................. 524/252; 524/254; 524/255; 524/588; 524/861; 528/10; 528/43
[58] Field of Search ............... 524/252, 255, 861, 588, 524/714; 528/43, 10

[56] References Cited

U.S. PATENT DOCUMENTS

| | | | |
|---|---|---|---|
| 3,432,460 | 3/1969 | Spacht | 524/255 |
| 4,637,889 | 1/1987 | Kishimoto et al. | 528/10 |
| 4,801,642 | 1/1989 | Janik et al. | 524/252 |
| 5,118,735 | 6/1992 | Burnier | 524/255 |
| 5,171,482 | 12/1992 | Asai | 524/233 |

FOREIGN PATENT DOCUMENTS 594154 4/1945 United Kingdom .............. 8702/45

OTHER PUBLICATIONS

Chemical Abstracts, vol. 85 No. 1 Jul. 5, 1976 Abstract No. 6558q.

Abstract JP 62283194; Shin-Etsu Chemical Co. Ltd. Dec. 9, 1987.

*Primary Examiner*—Paul R. Michl
*Assistant Examiner*—Tae H. Yoon
*Attorney, Agent, or Firm*—Sharon K. Severance

[57] ABSTRACT

The instant invention pertains to viscous fluid coupling organopolysiloxane compositions comprised of (A) at least one organopolysiloxane fluid that has the general formula $R^1_a R^2_b SiO_{[4-(a+b)]/2}$ wherein $R^1$ is an alkyl group, $R^2$ is an aryl group, $a+b$ has the value of 1.95 to 2.05, and $b/(a+b)$ has the value of 0.05 to 0.30; and (B) 0.01 to 5 weight parts by weight per 100 parts by weight of component (A) of a compound with the general formula

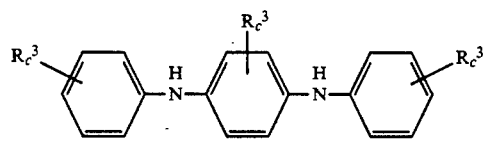

wherein each $R^3$ is independently selected from an alkyl group and C has the value of 0 to 2. The viscous fluid coupling organopolysiloxane compositions of the instant invention are capable of withstanding long-term use and under high-temperature, high-shear conditions with little increase or decrease in viscosity and almost no torque fluctuation.

11 Claims, No Drawings

ORGANOPOLYSILOXANE COMPOSITION FOR VISCOUS FLUID COUPLING

BACKGROUND OF THE INVENTION

Organopolysiloxane fluids have been widely used for viscous fluid coupling because this application requires a fluid that exhibits such properties as a suitable viscosity, a high flash point, stability against oxidative and thermal degradation, and a low viscosity variation as a function of temperature.

However, due to the heat that develops as a result of the severe shear and friction that are generated in fluid coupling service, an organopolysiloxane fluid used by itself will deteriorate. For example, it will suffer from a viscosity rise or gelation after a particular period of time, and as a consequence it will lose its fluid-coupling function.

In response to this, the addition of various types of oxidation inhibitors to organopolysiloxane fluids has been investigated for the purpose of suppressing this deterioration. For example, Japanese Patent Publication Number Sho 55-18457 [18,457/1980] and U.S. Pat. No. 4,515,702 teach that dimethylpolysiloxane compositions having a small viscosity increase at high temperatures can be obtained by adding to dimethylpolysiloxane fluids a dimethylpolysiloxane with a low degree of polymerization that has been modified by an aromatic amine compound.

In each of the dimethylpolysiloxane compositions produced by the above-described methods, the aromatic amine-modified dimethylpolysiloxane undergoes a rearrangement reaction with the base oil dimethylpolysiloxane fluid under high temperatures in combination with high shear forces. This results in a decline in the viscosity of the dimethylpolysiloxane fluid itself. Thus, the application of such compositions to viscous fluid coupling is encumbered by a decline in the torque transmission ratio and a loss of fluid-coupling function.

Moreover, the cost of these methods is driven up by the complex procedure that is required in order to synthesize the aromatic amine-modified dimethylpolysiloxane.

It is an object of the instant invention to show a viscous fluid coupling organopolysiloxane composition that is capable of withstanding long-term use under high-temperature, high-shear conditions with little increase or decrease in viscosity and almost no torque fluctuation.

SUMMARY OF THE INVENTION

The present invention relates to an organopolysiloxane composition for viscous fluid coupling applications. The organopolysiloxane composition for viscous fluid coupling comprises (A) 100 weight parts organopolysiloxane fluid that has the general formula a

wherein $R^1$ is an alkyl group having 1 to 4 carbon atoms, $R^2$ is an aryl group having 6 to 7 carbon atoms, $a+b=1.95$ to 2.05, and $b/(a+b)=0.05$ to 0.30; and (B) 0.01 to 5 weight parts of a compound with the general formula

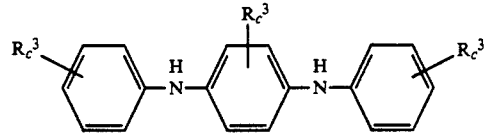

wherein each $R^3$ is independently selected from an alkyl group having 1 to 9 carbon atoms independently and C has the value of 0 to 2. The viscous fluid coupling organopolysiloxane compositions of the instant invention are stable to long-term exposure to high-shear, high-temperature conditions with little increase or decrease in viscosity.

THE INVENTION

The present invention relates to an organopolysiloxane composition for viscous fluid coupling applications. The organopolysiloxane compositions for viscous fluid coupling comprise (A) 100 weight parts organopolysiloxane fluid that has the general formula a

wherein $R^1$ is an alkyl group having 1 to 4 carbon atoms, $R^2$ is an aryl group having 6 to 7 carbon atoms, $a+b=1.95$ to 2.05, and $b/(a+b)=0.05$ to 0.30; and (B) 0.01 to 5 weight parts of a compound with the general formula

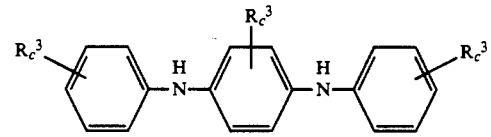

wherein each $R^3$ is independently selected from an alkyl group having 1 to 9 carbon atoms independently and C has the value of 0 to 2.

The organopolysiloxane component (A) of the present invention is the main or base component of the composition. The organopolysiloxane component (A) useful in the instant invention may be represented by $R^1_aR^2_bSiO_{[4-(a+b)]/2}$ wherein $R^1$ is an alkyl group having 1 to 4 carbon atoms, $R^2$ is an aryl group having 6 to 7 carbon atoms, $a+b=1.95$ to 2.05, and $b/(a+b)=0.05$ to 0.30. $R^1$ may be exemplified by, but not limited to an alkyl group, such as methyl, ethyl, propyl, isopropyl, butyl. It is preferred that $R^1$ be a methyl group. $R^2$ may be exemplified by, but not limited to, an aryl group such as phenyl, and tolyl. It is preferred $R^2$ be a phenyl group. $a+b$ should has the value of 1.95 to 2.05. The value of $b/(a+b)$ designates the proportion of aryl groups in the total organic groups. The viscosity temperature coefficient increases as the value of $b/(a+b)$ increases, and the viscosity decline at higher temperatures eventually becomes so large that torque transfer is impaired. On the other hand, small values for $b/(a+b)$ do not yield a satisfactory improvement in the heat resistance and also result in a reduced capacity to dissolve component (B). As a consequence, the value of $b/(a+b)$ should fall within the range of 0.05 to 0.30 and preferably falls within the range of 0.05 to 0.20.

The organopolysiloxane component (A) may be exemplified by trimethylsiloxy-terminated dimethylsiloxane-methylphenylsiloxane copolymers, trimethylsiloxy-terminated dimethylsiloxane-diphenylsiloxane copolymers, dimethyl-phenylsiloxy-terminated dimethylsiloxane-methylphenylsiloxane copolymers, dimethylphenylsiloxy-terminated dimethylsiloxane-diphenylsiloxane copolymers, and others.

No specific restrictions apply to the viscosity of this component. However, from the standpoint of torque transfer, it is preferable for the viscosity at 25° C. to fall within the range of 100 to 1,000,000 centistokes and more preferably falls within the range of 500 to 500,000 centistokes.

The organopolysiloxane component (A) in the composition of the present invention may take the form of a single species or it may take the form of a mixture of two or more species with different viscosities or a mixture of two or more species with different chemical structures.

The component (B) of the present invention is the component that characterizes or distinguishes the present invention. Component (B) is a compound with the following general formula

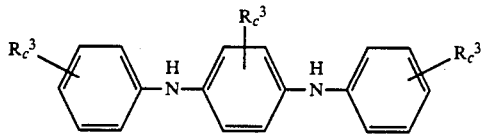

wherein each $R^3$ is independently selected from the same or different alkyl group and C independently has the value of 0 to 2 having 1 to 9 carbon atoms. $R^3$ may be as exemplified by, but not limited to methyl, ethyl, propyl, isopropyl, octyl, and nonyl. Component (B) may be exemplified by the compounds given below.

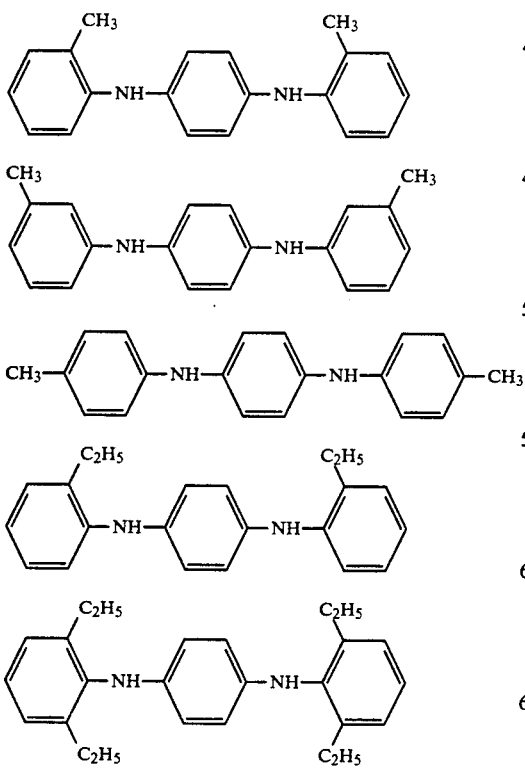

-continued

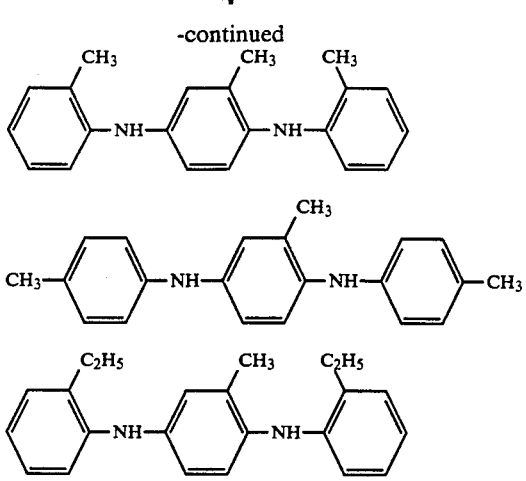

The amount of component (B) added is 0.01 to 5 weight parts by weight per 100 weight parts by weight of component (A). The functional effect of this component does not appear at additions below 0.01 weight parts. On the other hand, this component is only weakly soluble in component (A) at additions in excess of 5 weight parts, which then makes the preparation of a homogeneous organopolysiloxane composition highly problematic.

The composition of the present invention is prepared simply by mixing the specified quantities of the above-described components (A) and (B) to homogeneity. It will be advantageous to mix component (A) and (B) while heating. Typically the temperature is within the range of 60° C. to 130° C. In addition, the composition of the present invention can be manufactured by preliminarily mixing component (B) to homogeneity in part of component (A) and thereafter mixing in the remainder of component (A).

So that those skilled in the art can understand and appreciate the invention taught herein, the following examples are presented, being it understood that these examples should not be used to limit the scope of this invention found in the claims attached hereto.

In these examples, parts designates weight parts, the viscosity was measured at 25° C., and cs is an abbreviation for centistokes.

EXAMPLE 1

An organopolysiloxane fluid with a viscosity of 4,200 cs was first prepared by mixing 20 parts of a trimethylsiloxy-terminated dimethylsiloxane-diphenylsiloxane copolymer (viscosity=130 cs, diphenylsiloxane unit content=15 mol %) with 80 parts of a trimethylsiloxy-terminated dimethylsiloxane-diphenylsiloxane copolymer (viscosity=7,000 cs, diphenylsiloxane unit content=15 mol %).

A viscous fluid coupling organopolysiloxane composition was prepared by the addition of 0.5 parts of a mixture of N,N'-ditolyl-para-phenylenediamines to 100 part of the organopolysiloxane fluid while mixing by stirring for 5 minutes at 80° C. under a nitrogen blanket. This mixture of N,N'-ditolyl-p-phenylenediamines was a thick, blackish brown liquid that consisted of a mixture of N,N'-di(ortho-tolyl)-para-phenylenediamine, N,N'-di(meta-tolyl)-para-phenylenediamine, and N,N'-di(para-tolyl)-para-phenylenediamine.

30 g of the viscous fluid coupling organopolysiloxane composition was collected in a 100 mL beaker and held in a hot-air circulation oven at 280° C., and its timewise variation in viscosity was measured (Test 1).

80 g of the viscous fluid coupling organopolysiloxane composition was poured into a fluid-coupling device and subjected to continuous operation at 3,000 rpm/280° C. ambient temperature, and the time was measured until gelation of the viscous fluid coupling organopolysiloxane composition (Test 2).

The results for Tests 1 and 2 are reported below in Table 1. In Table 1, the "Maximum Viscosity Decline" reports the percentage viscosity change at the time point at which the viscosity decline during the test reached a maximum. The "Time to the Maximum Viscosity Decline" reports the time required for the viscosity to reach its minimum. Finally, the "Gelation Time" reports the time at which a loss of fluidity was observed due to the increase in the viscosity.

EXAMPLE 2

A viscous fluid coupling organopolysiloxane composition was prepared by the addition of 0.5 parts of the N,N'-ditolyl-p-phenylenediamine mixture used in Example 1 to 100 parts trimethylsiloxy-terminated dimethylsiloxane-diphenylsiloxane copolymer (viscosity=10,000 cs, diphenylsiloxane unit content=10 mol%) with mixing by stirring for 5 minutes at 100° under a nitrogen blanket.

The properties of the resulting composition were measured in the same manner as described in Example 1. The results are reported in Table 1.

EXAMPLE 3

A viscous fluid coupling organopolysiloxane composition was prepared by the addition of 0.5 parts of the N,N'-ditolyl-p-phenylenediamine mixture used in Example 1 to 100 parts trimethylsiloxy-terminated dimethylsiloxane-diphenylsiloxane copolymer (viscosity=10,000 cs, diphenylsiloxane unit content= 15 mol %) with mixing by stirring for 5 minutes at 80° C. under a nitrogen blanket.

The properties of the resulting composition were measured in the same manner as described in Example 1. The results are reported in Table 1.

COMPARISON EXAMPLE 1

A viscous fluid coupling organopolysiloxane composition was prepared as in Example 1, but the N,N'-ditolyl-p-phenylenediamine mixture used in Example 1 was omitted. The properties of the resulting composition were measured in the same manner as described in Example 1. The results are reported in Table 1 as Sample C1.

TABLE 1

| Sample | Initial Viscosity (cs) | TEST 1 Maximum Viscosity Decline (%) | TEST 1 Time to the Maximum Viscosity Decline (hours) | TEST 1 Gelation Time (hours) | TEST 2 Gelation Time (hours) |
|---|---|---|---|---|---|
| 1 | 4200 | 31 | 67 | 335 | 180 |
| 2 | 10000 | 34 | 67 | 289 | — |
| 3 | 10000 | 24 | 20 | 289 | — |
| C1 | 4200 | 32 | 23 | 108 | 30 |

Because the viscous fluid coupling organopolysiloxane composition of the present invention consists of components (A) and (B), and in particular because it contains the special compound comprising component (B), it is characterized by its ability to withstand long-term use under high-temperature, high-shear conditions with little increase or decrease in viscosity and almost no fluctuation in torque.

What is claimed is:

1. A viscous fluid coupling organopolysiloxane composition comprising (A) at least one organopolysiloxane fluid that has the general formula

$R^1_a R^2_b SiO_{[4-(a+b)]/2}$ wherein $R^1$ is an alkyl group having 1 to 4 carbon atoms, $R^2$ is an aryl group having 6 to 7 carbon atoms, a+b has the value of 1.95 to 2.05, and b/(a+b) has the value of 0.05 to 0.30; and (B) 0.01 to 5 weight parts by weight per 100 parts by weight of component (A) of a compound with the general formula

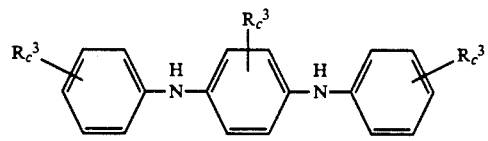

wherein each $R^3$ is independently selected from an alkyl group having 1 to 9 carbon atoms and c independently has a value of 0 to 2, with the proviso that there be at least two $R^3$ groups per molecule.

2. A viscous fluid organopolysiloxane composition as claimed in claim 1 wherein in component (A) $R^1$ is a methyl group.

3. A viscous fluid organopolysiloxane composition as claimed in claim 1 wherein in component (A) $R^2$ is a phenyl group.

4. A viscous fluid organopolysiloxane composition as claimed in claim 1 wherein in component (A) b/(a+b) has the value of 0.05 to 0.20.

5. A viscous fluid organopolysiloxane composition as claimed in claim 1 wherein component (A) is a trimethylsiloxy-terminated dimethylsiloxane-methylphenylsiloxane copolymer.

6. A viscous fluid organopolysiloxane composition as claimed in claim 1 wherein component (A) is a trimethylsiloxy-terminated dimethylsiloxane-diphenylsiloxane copolymer.

7. A viscous fluid organopolysiloxane composition as claimed in claim 1 wherein component (A) is a dimethylphenylsiloxy-terminated dimethylsiloxane-methylphenylsiloxane copolymer.

8. A viscous fluid organopolysiloxane composition as claimed in claim 1 wherein component (A) is a dimethylphenylsiloxy-terminated dimethylsiloxane-diphenylsiloxane copolymer.

9. A viscous fluid organopolysiloxane composition as claimed in claim 1 wherein in component (B) $R^3$ is a methyl group.

10. A viscous fluid organopolysiloxane composition as claimed in claim 1 wherein in component (B) $R^3$ is an ethyl group.

11. A viscous fluid organopolysiloxane composition as claimed in claim 1 wherein in component (B) is a mixture.

* * * * *